United States Patent
Ingram et al.

(10) Patent No.: US 6,574,953 B1
(45) Date of Patent: Jun. 10, 2003

(54) NOX PURGE AIR/FUEL RATIO SELECTION

(75) Inventors: Grant Alan Ingram, West Lafayette, IN (US); Gopichandra Surnilla, West Bloomfield, MI (US); Jeffrey Scott Hepburn, Birmingham, MI (US); John M. Roth, Grosse Ile, MI (US); Joseph Robert Theis, Rockwood, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/012,577

(22) Filed: Nov. 29, 2001

(51) Int. Cl.$^7$ ................................................ F01N 3/00
(52) U.S. Cl. ..................... 60/277; 60/274; 60/285; 60/286; 60/287; 60/292; 60/297
(58) Field of Search ..................... 60/277, 274, 285, 60/286, 292, 295, 297, 287, 298, 320, 324

(56) References Cited

U.S. PATENT DOCUMENTS

| | | | |
|---|---|---|---|
| 5,450,722 A | * | 9/1995 | Takeshima et al. ........... 60/285 |
| 5,544,482 A | * | 8/1996 | Matsumoto et al. .......... 60/279 |
| 5,740,669 A | * | 4/1998 | Kinugasa et al. ............. 60/285 |
| 5,771,686 A | * | 6/1998 | Pischinger et al. ........... 60/274 |
| 5,832,721 A | * | 11/1998 | Cullen ......................... 60/274 |
| 5,855,113 A | * | 1/1999 | Cullen et al. ................. 60/274 |
| 5,996,338 A | * | 12/1999 | Hirota ......................... 60/285 |

* cited by examiner

Primary Examiner—Thomas Denion
Assistant Examiner—Binh Tran
(74) Attorney, Agent, or Firm—Julia Voutyras; Allan J. Lippa

(57) ABSTRACT

A method for improving a purge conversion efficiency of a Lean NOx Trap coupled downstream of a lean-burn internal combustion engine is presented. This method recognizes that during a purge of the LNT, its temperature increases due to the exothermic reactions in the LNT. Once the LNT temperature exceeds a certain threshold, further increases lead to a reduction in the NOx storage capacity, and therefore an increase in NOx emissions during the purge of the LNT. Therefore, it is proposed to cool the LNT temperature once the threshold is exceeded. This method improves emission control and fuel economy during purge.

13 Claims, 3 Drawing Sheets

NOX PURGE AIR/FUEL RATIO SELECTION

FIELD OF INVENTION

The present invention relates to a system and a method for controlling a lean-burn internal combustion engine, and more particularly, to minimizing NOx emissions during a purge of the LNT.

BACKGROUND OF THE INVENTION

Internal combustion engines are typically coupled to an emission control device known as a three-way catalytic converter (TWC) designed to reduce combustion by-products such as carbon monoxide (CO), hydrocarbon (HC) and oxides of nitrogen (NOx). Engines can operate at air-fuel mixture ratios lean of stoichiometry, thus improving fuel economy. For lean engine operation, an additional three-way catalyst commonly referred to as a Lean NOx Trap (LNT), is usually coupled downstream of an upstream three-way catalyst. The LNT, like the TWC, stores exhaust gas constituents such as, for example, nitrogen oxides, NOx, when the engine is operating at a lean air-fuel ratio, and reduces (purges) them when the engine is operating at a rich or stoichiometric air-fuel ratio.

Because continued lean operation will ultimately saturate the LNT with NOx, the prior art teaches periodically varying the air-fuel ratio from a nominally lean setting to a rich setting, during which stored NOx are released from the LNT and reduced by the available hydrocarbons and carbon monoxides in the enriched operating condition.

The inventors herein have recognized that during the purge, some of the released NOx is not reduced, and is therefore emitted into the atmosphere. The inventors have further recognized that the LNT temperature raises during the purge due to the exothermic reaction created by the reduction of NOx by CO in the rich air fuel mixture entering the LNT, and once the temperature exceeds a predetermined threshold, the LNT's NOx storage capacity decreases with increasing temperature. Therefore, the inventors recognized that this decrease in the NOx storage capacity as the LNT temperature is increasing, would cause the NOx to be displaced from the LNT until the absorbed NOx is equivalent to the reduced LNT capacity at higher temperature. The NOx thus displaced would exit the LNT as emissions, and therefore the performance of the LNT would be degraded.

SUMMARY OF THE INVENTION

In solving the above problem, a system and a method are provided for decreasing NOx emissions during an LNT purge by active temperature control of the LNT.

In carrying out the above solution, features and advantages of the present invention, a system and a method for improving a performance of an exhaust gas aftertreatment device during a purge, the device coupled downstream of a lean-burn internal combustion engine, include: providing an indication of a device operating condition, wherein said condition is reached when a capacity of the device to store an exhaust gas component decreases with increases in a temperature of the device; and in response to said indication, adjusting an operating parameter, thereby decreasing said device temperature.

An advantage of the present invention is improved emission control, due to the fact that maintaining the temperature of the LNT in the region where NOx storage capacity does not reduce with increases in temperature, reduces NOx emissions during purge.

The above advantages and other advantages, objects and features of the present invention will be readily apparent from the following detailed description of the preferred embodiments when taken in connection with the accompanying drawings.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT(S)

As will be appreciated by those of ordinary skill in the art, the present invention is independent of the particular underlying engine technology and configuration. As such, the present invention may be used in a variety of types of internal combustion engines, such a s conventional engines in addition to direct injection stratified charge (DISC) or direct injection spark ignition engines (DISI).

Figure 1:
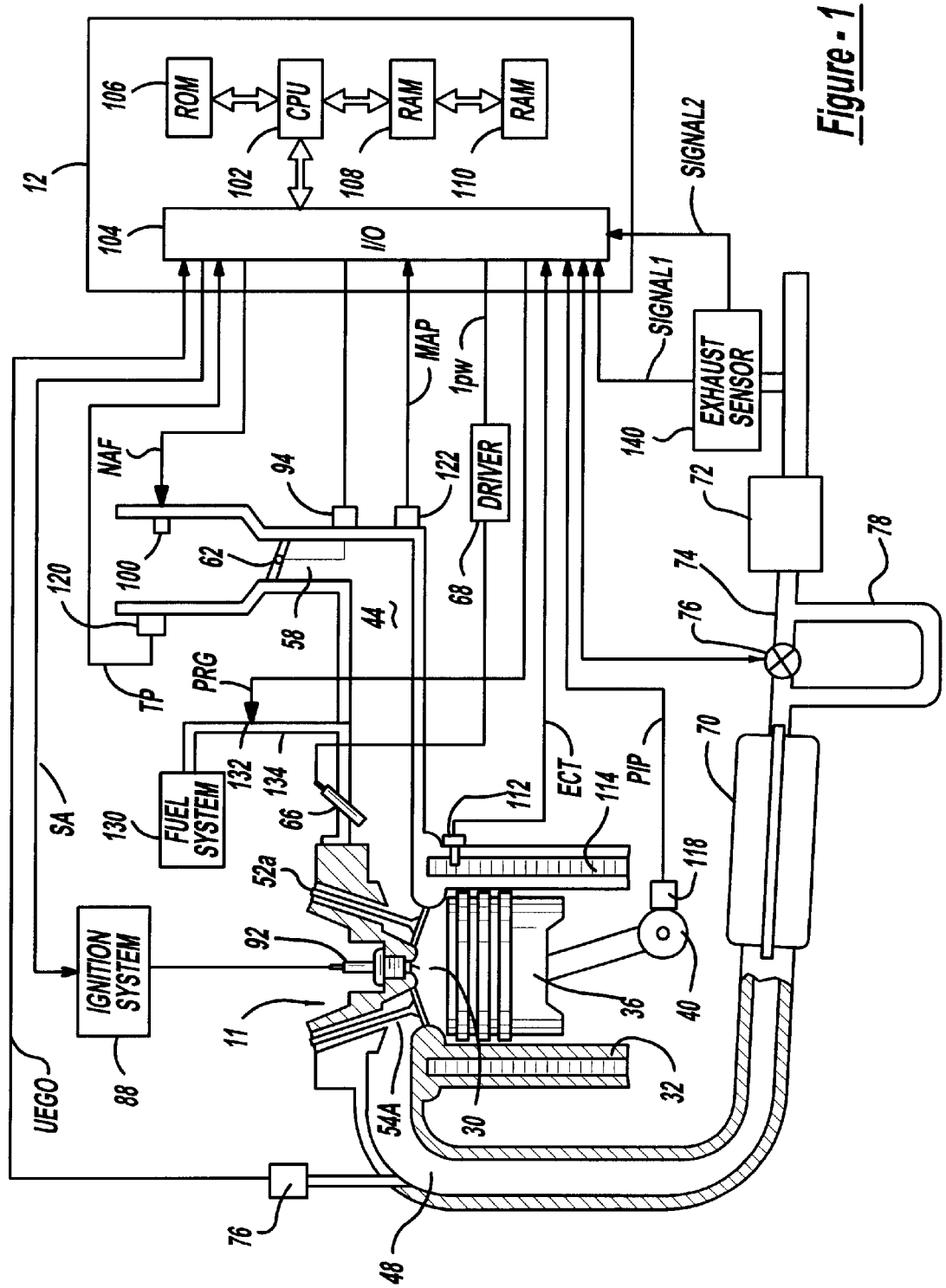
FIG. 1 is a block diagram of an internal combustion engine illustrating various components related to the present invention.

A block diagram illustrating an engine control system and method for a representative internal combustion engine according to the present invention is shown in FIG. 1. Preferably, such an engine includes a plurality of combustion chambers only one of which is shown, and is controlled by electronic engine controller 12. Combustion chamber 30 of engine 10 includes combustion chamber walls 32 with piston 36 positioned therein and connected to crankshaft 40. In this particular example, the piston 30 includes a recess or bowl (not shown) for forming stratified charges of air and fuel. In addition, the combustion chamber 30 is shown communicating with intake manifold 44 and exhaust manifold 48 via respective intake valves 52a and 52b (not shown), and exhaust valves 54a and 54b (not shown). A fuel injector 66 is shown directly coupled to combustion chamber 30 for delivering liquid fuel directly therein in proportion to the pulse width of signal fpw received from controller 12 via conventional electronic driver 68. Fuel is delivered to the fuel injector 66 by a conventional high-pressure fuel system (not shown) including a fuel tank, fuel pumps, and a fuel rail.

Intake manifold 44 is shown communicating with throttle body 58 via throttle plate 62. In this particular example, the throttle plate 62 is coupled to electric motor 94 such that the position of the throttle plate 62 is controlled by controller 12 via electric motor 94. This configuration is commonly referred to as electronic throttle control, (ETC), which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas sensor 76 is shown coupled to exhaust manifold 48 upstream of catalytic converter 70. In this particular example, sensor 76 is a universal exhaust gas oxygen (UEGO) sensor, also known as a proportional oxygen sensor. The UEGO sensor generates a signal whose magnitude is proportional to the oxygen level (and the air-fuel ratio) in the exhaust gases. This signal is provided to controller 12, which converts it into a relative air-fuel ratio.

Advantageously, signal UEGO is used during feedback air-fuel ratio control in to maintain average air-fuel ratio at a desired air-fuel ratio as described later herein. In an alternative embodiment, sensor 76 can provide signal EGO, exhaust gas oxygen (not shown), which indicates whether exhaust air-fuel ratio is lean or rich of stoichiometry. In another alternate embodiment, the sensor 76 may comprise one of a carbon monoxide (CO) sensor, a hydrocarbon (HC) sensor, and a NOx sensor that generates a signal whose magnitude is related to the level of CO, HC, NOx, respectively, in the exhaust gases.

Those skilled in the art will recognize that any of the above exhaust gas sensors may be viewed as an air-fuel ratio sensor that generates a signal whose magnitude is indicative of the air-fuel ratio measured in exhaust gases.

Conventional distributorless ignition system 88 provides ignition spark to combustion chamber 30 via spark plug 92 in response to spark advance signal SA from controller 12.

Controller 12 causes combustion chamber 30 to operate in either a homogeneous air-fuel ratio mode or a stratified air-fuel ratio mode by controlling injection timing. In the stratified mode, controller 12 activates fuel injector 66 during the engine compression stroke so that fuel is sprayed directly into the bowl of piston 36. Stratified air-fuel layers are thereby formed. The stratum closest to the spark plug contains a stoichiometric mixture or a mixture slightly rich of stoichiometry, and subsequent strata contain progressively leaner mixtures.

In the homogeneous mode, controller 12 activates fuel injector 66 during the intake stroke so that a substantially homogeneous air-fuel mixture is formed when ignition power is supplied to spark plug 92 by ignition system 88. Controller 12 controls the amount of fuel delivered by fuel injector 66 so that the homogeneous air-fuel ratio mixture in chamber 30 can be selected to be substantially at (or near) stoichiometry, a value rich of stoichiometry, or a value lean of stoichiometry. Operation substantially at (or near) stoichiometry refers to conventional closed loop oscillatory control about stoichiometry. The stratified air-fuel ratio mixture will always be at a value lean of stoichiometry, the exact air-fuel ratio being a function of the amount of fuel delivered to combustion chamber 30. An additional split mode of operation wherein additional fuel is injected during the exhaust stroke while operating in the stratified mode is available. An additional split mode of operation wherein additional fuel is injected during the intake stroke while operating in the stratified mode is also available, where a combined homogeneous and split mode is available.

Lean NOx trap 72 is shown positioned downstream of catalytic converter 70. Both devices store exhaust gas components, such as NOx, when engine 10 is operating lean of stoichiometry. These are subsequently reacted with HC, CO and other reductant and are catalyzed during a purge cycle when controller 12 causes engine 10 to operate in either a rich mode or a near stoichiometric mode.

Exhaust gas manifold 74 has a control valve 76 disposed in it. The valve is controlled by controller 12, which sends a signal to open or close the valve, thus enabling or disabling passage of the exhaust gas through it. Additionally, exhaust gas manifold 74 has a cooling loop 78. When the LNT temperature needs to be increased, valve 76 is open, and most of the hot exhaust gas travels via the short path, thus causing the LNT temperature to rise. When the LNT temperature needs to be lowered, valve 76 is closed, thus routing the gas through the cooling loop, where it cools down prior to entering the LNT, thus lowering the LNT temperature. Alternatively, the LNT temperature could be lowered or raised by adjusting engine-operating parameters such as spark timing, air-fuel ratio, compression ratio, etc.

Controller 12 is shown in FIG. 1 as a conventional microcomputer including but not limited to: microprocessor unit 102, input/output ports 104, an electronic storage medium for executable programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: measurement of inducted mass air flow (MAF) from mass air flow sensor 101 coupled to throttle body 58; engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor 120; and absolute manifold pressure signal MAP from sensor 122. Engine speed signal RPM is generated by controller 12 from signal PIP in a conventional manner and manifold pressure signal MAP provides an indication of engine load.

Fuel system 130 is coupled to intake manifold 44 via tube 132. Fuel vapors (not shown) generated in fuel system 130 pass through tube 132 and are controlled via purge valve 134. Purge valve 134 receives control signal PRG from controller 12.

Exhaust sensor 140 is a NOx/UEGO sensor located downstream of the LNT. It produces two output signals. First output signal (SIGNAL1) and second output signal (SIGNAL2) are both received by controller 12. Exhaust sensor 140 can be a sensor known to those skilled in the art that is capable of indicating both exhaust air-fuel ratio and nitrogen oxide concentration.

In a preferred embodiment, SIGNAL1 indicates exhaust air-fuel ratio and SIGNAL2 indicates nitrogen oxide concentration. In this embodiment, sensor 140 has a first chamber (not shown) in which exhaust gas first enters where a measurement of oxygen partial pressure is generated from a first pumping current. Also, in the first chamber, oxygen partial pressure of the exhaust gas is controlled to a predetermined level. Exhaust air-fuel ratio can then be indicated based on this first pumping current. Next, the exhaust gas enters a second chamber (not shown) where NOx is decomposed and measured by a second pumping current using the predetermined level. Nitrogen oxide concentration can then be indicated based on this second pumping current. In an alternative embodiment, a separate NOx sensor could be used in conjunction with an air-fuel sensor, which could be a UEGO or a HEGO sensor.

Figure 2:
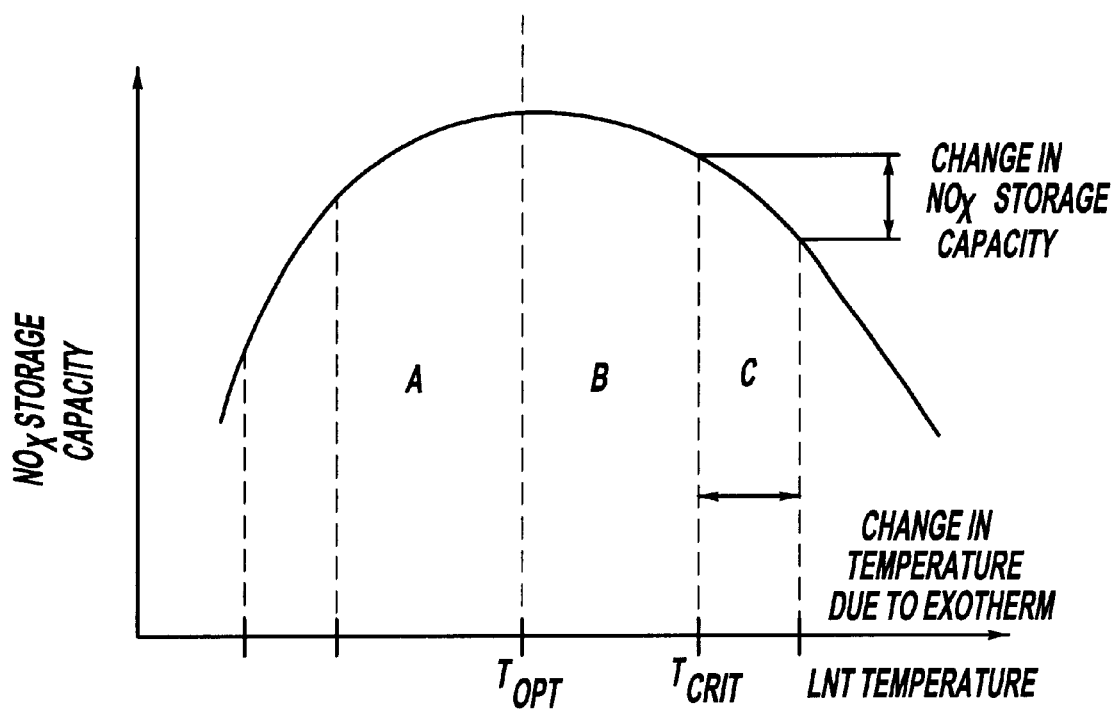
FIG. 2 is a plot of the LNT NOx storage capacity during a purge vs. the LNT temperature.

FIG. 2 is a plot of the LNT NOx storage capacity vs. the LNT temperature during a NOx purge. As can be seen, at lower LNT purge temperatures (Region A), NOx storage capacity increases with increasing LNT temperatures, until $T_{opt}$, an LNT temperature at which maximum NOx storage capacity is achieved. At higher LNT purge temperatures (Region B), NOx storage capacity decreases with increasing LNT temperatures. The drop in NOx storage capacity with increasing LNT temperatures is especially noticeable in region C, when the LNT temperature exceeds $T_{crit}$. As can be seen in the plot, if the LNT is saturated with NOx at temperatures above $T_{crit}$, an increase in temperature would cause NOx to be displaced and released into the atmosphere till the absorbed NOx is equal to the new reduced LNT NOx storage capacity. Therefore, in order to reduce the amount of NOx released during a NOx purge, the LNT temperature needs to be controlled to be below $T_{crit}$. This can be accomplished by using the cooling loop as described with particular reference in FIG. 2 above.

Figure 3:
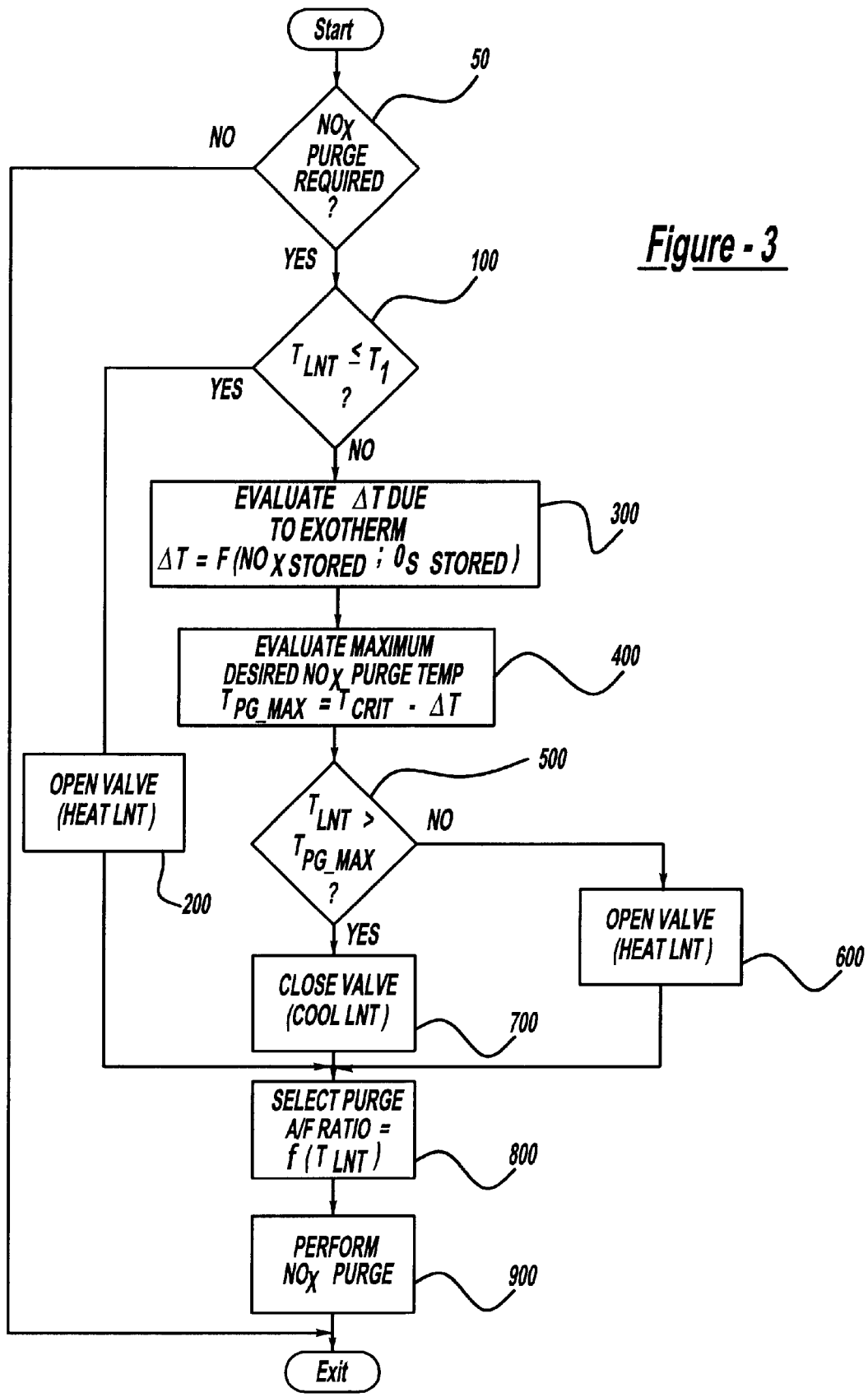
FIG. 3 is a block diagram of the embodiment in which the invention is used to advantage.

The diagram in FIG. 3 generally represents operation of one embodiment of a system or method according to the present invention. As will be appreciated by one of ordinary skill in the art, the diagram may represent one or more of any number of processing strategies such as event-driven, interrupt-driven, multi-tasking, multi-threading, and the like. As such, various steps or functions illustrated may be performed in the sequence illustrated, I parallel, or in some cases omitted. Likewise, the order of processing is not necessarily required to achieve the objects, features and advantages of the invention, but is provided for ease of illustration and description.

Although not explicitly illustrated, one of ordinary skill in the art will recognize that one or more of the illustrated steps or functions may be repeatedly performed depending on the particular strategy being used.

Referring now to FIG. 3, first, in step 50, a determination is made whether a NOx purge should be performed. If the answer to step 50 is NO, the routine exits. If the answer to step 50 is YES, the routine proceeds to step 100, where a determination is made whether the LNT temperature is less than or equal to $T_1$ (250 deg. C. in this example). If the answer to step 100 is YES, the valve 76 described above with particular reference to FIG. 1 is open (step 200) thus allowing most of the exhaust gas mixture to travel to the LNT via manifold 74 described above with particular reference to FIG. 1, and heat the LNT. The routine then proceeds to step 800 wherein a purge mixture air-fuel ratio is selected as a function of the LNT temperature. The routine then proceeds to step 900 wherein a NOx purge is performed. If the answer to step 100 is NO, i.e. the LNT temperature is above $T_1$, the routine proceeds to step 300 wherein ·T, a temperature rise in the LNT due to the exothermal reaction created by the LNT purge is determined from a look-up table based on the amount of NOx and oxygen stored in the LNT. The amounts of NOx and $O_2$ stored in the LNT could be estimated, for example, from engine operating conditions, such as engine speed, load, air-fuel ratio, etc. Next, in step 400, $T_{pg\_max}$, the maximum desired LNT temperature at the beginning of the NOx purge, is calculated:

$$T_{pg\_max} = T_{crit} - \Delta T,$$

wherein $T_{crit}$ is the temperature above which the LNT NOx storage capacity decreases with further temperature increases due to exothermic reactions in the LNT (in this example, 450 deg. C.). The value of $T_{crit}$ is typically experimentally determined from the physical and chemical characteristics of the LNT. Next, in step 500, a determination is made whether $T_{LNT}$, the current LNT temperature is greater than $T_{pg\_max}$. If the answer to step 500 is YES, further increases in the LNT temperature will cause a reduction in NOx storage capacity, and consequently cause an increase in NOx emissions during the purge. Therefore, in accordance with the present invention, the routine proceeds to step 700, wherein valve 76 is closed thus routing the exhaust gas mixture exiting the engine via the cooling loop 78. Thus cooled exhaust gas mixture enters the LNT and reduces its temperature below $T_{pg\_max}$ so that NOx emissions during a purge are reduced. The routine then proceeds to step 800 wherein a purge air-fuel ratio is selected, and then to step 900 wherein a NOx purge commences. The routine then exits. If the answer to step 500 is YES, i.e., the temperature of the LNT is below the maximum desired LNT purge temperature, the routine proceeds to step 600 wherein valve 76 is opened thus allowing most of the exhaust gas mixture exiting the engine to travel via manifold 74. The routine then proceeds to step 800 described above.

Therefore, according to the present invention, it is possible to reduce the amount of NOx emissions released during a NOx purge of the LNT by determining a critical temperature above which the NOx storage capacity of the LNT reduces with further increases in temperature, and by reducing the LNT temperature once the threshold is reached. The reduction can be accomplished by cooling off of the exhaust gas mixture entering the LNT either by routing the mixture via a cooling loop, or by adjusting engine parameters, such as the air-fuel ratio, spark timing, compression ratio, etc. Further, using this method, the LNT temperature during the purge can be maintained close to the optimal temperature for achieving peak NOx storage capacity. Note that the method according to the present invention also provides an indication of an exhaust gas treatment device (such as a lean NOX trap) operating condition, wherein said condition is reached when a capacity of the device to store an exhaust gas component decreases with increases in a temperature of the device, wherein said indication is provided based on a signal from a temperature sensor disposed inside the exhaust gas aftertreatment device.

This concludes the description of the invention. The reading of it by those skilled in the art would bring to mind many alterations and modifications without departing from the spirit and the scope of the invention. Accordingly, it is intended that the scope of the invention be defined by the following claims:

What is claimed is:

1. A system for improving a performance of an exhaust gas aftertreatment device coupled downstream of an internal combustion engine, the system comprising:

a manifold connecting the engine and the device, said manifold comprising a first branch and a second branch;

a valve disposed in said manifold, said valve directing a flow of an exhaust gas mixture entering said manifold through at least one of said first branch and said second branch; and a controller determining that a temperature of the device is above a predetermined threshold, in response to said determination, calculating a rate of change of a NOx storage capacity of the device as a function of said device temperature, and controlling said valve such that the flow of said exhaust gas mixture is substantially directed through said second branch when said capacity rate of change is below a precalculated value.

2. The system as set forth in claim 1 wherein the exhaust gas aftertreatment device is a three-way catalyst.

3. The system as set forth in claim 1 wherein said three-way catalyst is a lean NOx trap.

4. The system as set forth in claim 1 wherein said precalculated value is substantially zero.

5. A method for improving performance of an exhaust gas aftertreatment device, the device coupled downstream of a lean-burn internal combustion engine, the method comprising:

determining whether the engine should be operated at a rich or stoichiometric air-fuel ratio;

determining, based on operating conditions, whether a temperature increase caused by said rich or stoichiometric engine operation will increase device temperature beyond a predetermined temperature value where capacity of the device to store an exhaust gas component decreases with increases in temperature; and in response to said determination of temperature increase, adjusting an operating parameter to decrease device temperature.

6. The method recited in claim 5 wherein said operating condition includes engine load or engine speed.

7. The method recited in claim 5 wherein said operating condition includes engine air-fuel ratio.

8. The method recited in claim 5 wherein said exhaust gas component is NOx.

9. The method recited in claim 5 further comprising, in response to said determination of temperature increase, and said determination of whether the engine should be operated at said rich or stoichiometric air-fuel ratio, changing the engine air-fuel ratio.

10. The method recited in claim 9 wherein said changed air-fuel ratio is selected based on device temperature.

11. The method recited in claim 5 wherein said operating parameter is an engine operating parameter.

12. The method recited in claim 5 wherein said operating parameter is a valve position of a valve coupled in an exhaust of the engine.

13. The method recited in claim 5 wherein said determination of temperature increase is based on a determination of temperature increase caused by an exothermic reaction in the device.

* * * * *